Patented July 14, 1953

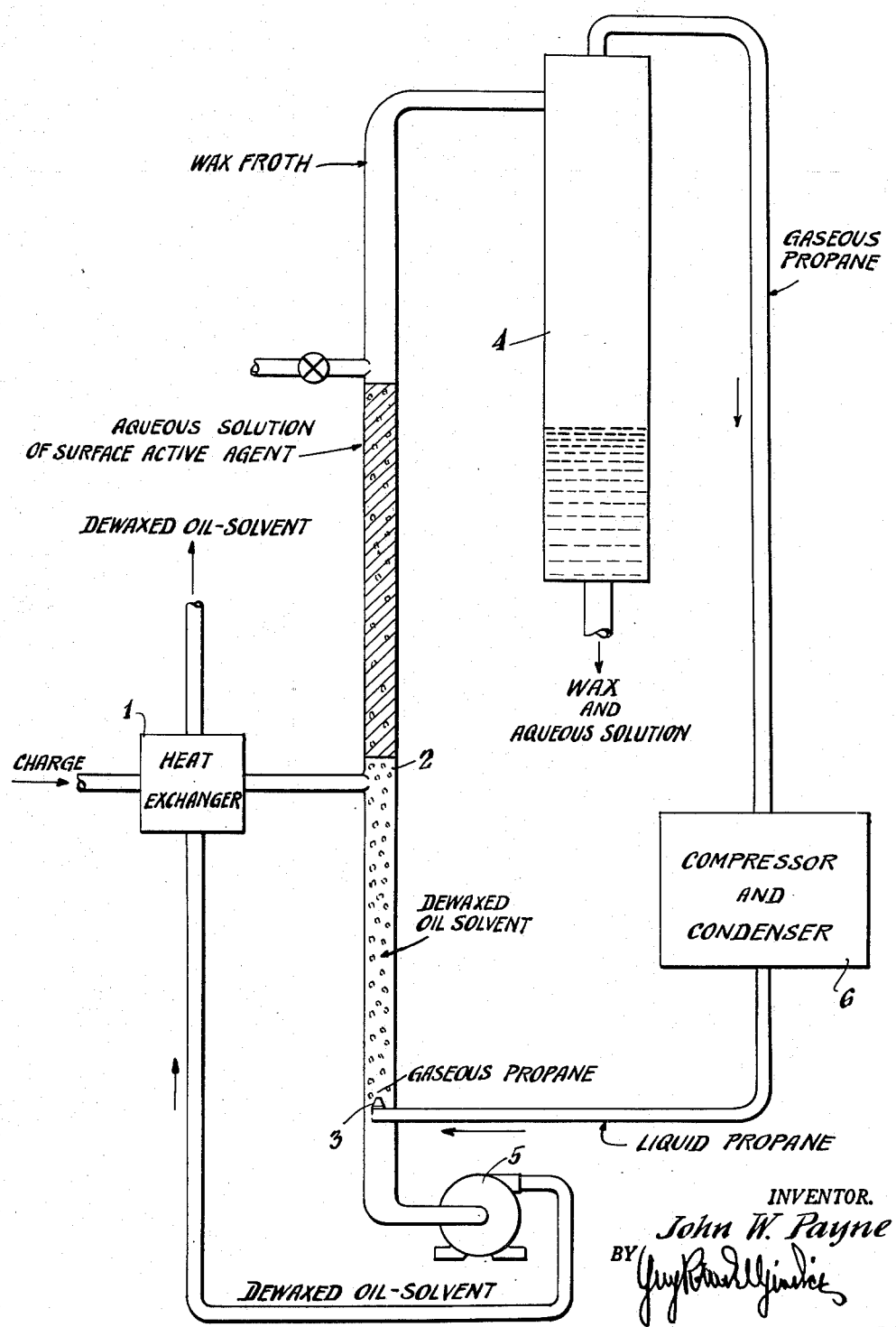

2,645,599

UNITED STATES PATENT OFFICE 2,645,599

PROCESS FOR SEPARATING WAX FROM WAX-OIL MIXTURES

John W. Payne, Woodbury, N. J., assignor to Socony-Vacuum Oil Company, Incorporated, a corporation of New York Application November 28, 1950, Serial No. 197,924

8 Claims. (Cl. 196—18)

This invention relates to the separation of wax from wax-oil mixtures or solutions of wax in oil, and is more particularly concerned with a process for dewaxing wax-containing hydrocarbon fractions. More specifically, the present invention provides a gravity method for separating wax or oil from wax-oil mixtures or from solutions of wax in oil.

As is well known to those familiar with the art, various methods of dewaxing wax-containing hydrocarbon fractions have been proposed and several of them are being utilized in the petroleum industry. The methods fall into three main categories which, for convenience, may be enumerated as follows:

1. Filter press dewaxing of low-viscosity, wax-containing oils with or without dilution with a suitable diluent or solvent.

2. Centrifuge dewaxing of high-viscosity, wax-containing oils diluted with a suitable diluent or solvent.

3. Solvent dewaxing of low- or high-viscosity, wax-containing oils (a) employing filtration for separating wax and oil; (b) employing centrifugation for separating wax and oil.

Filter press dewaxing of low-viscosity, wax-containing oils comprises chilling a wax-containing hydrocarbon fraction having a S. U. V. of about 75–80 seconds at 100° F. to a temperature slightly below that at which the dewaxed hydrocarbon fraction should flow, and, thereafter, subjecting the thus chilled hydrocarbon fraction to a filter pressing operation to separate, from the hydrocarbon fraction, the crystalline wax which has precipitated during the chilling operation. Filter press dewaxing is frequently employed in conjunction wtih naphtha as a diluent for the stock to be dewaxed, especially when high wax-content stocks are being processed or when low oil-content waxes are desired. However, filter press dewaxing is not applicable to the treatment of heavy oils. This is due to the difficulty of filtering oil through the cake formed by the fine crystals of ceresin waxes present in these heavy oils.

Centrifuge dewaxing comprises passing continuously a chilled solution of residual oil in naphtha through a centrifuge revolving at about 17,000 R. P. M., separating the oil and wax streams and, subsequently, removing the solvent naphtha therefrom. Centrifuge dewaxing is generally applicable to the treatment of residual oils. This is due to the large crystal structure and the resulting poor flow characteristics of the paraffinic waxes present in low-viscosity oils. However, with suitable modifications, centrifuge dewaxing can be applied to the processing of distillate oils. Moreover, centrifuge dewaxing has the disadvantage of producing high oil-content waxes and oils which, on standing, sometimes develop wax clouds due to ineffectual dewaxing of the wax-containing residual oils.

The availability, at moderate cost, of new solvents having given desired characteristics has led to the development of numerous types of solvent dewaxing processes. In general, in these processes, the wax-containing oil is mixed with prescribed amounts of a solvent or diluent and the mixture is chilled to a predetermined temperature. The chilled mixture is then subjected either to a filtering operation or to a centrifuging operation to separate, from the oil, the wax which has precipitated during the chilling operation. Finally, the solvent is stripped from the wax and from the dewaxed oil.

The benzol-ketone dewaxing process is typical of the solvent dewaxing processes and, probably, is the most extensively used in the petroleum industry for dewaxing both low- and high-viscosity wax-containing oils and for deoiling the waxes thus obtained in rerun processing. In this process, waxy oil or oily wax, admixed with a solvent containing about 40 per cent methyl-ethyl ketone, 52 per cent benzol and 8 per cent toluol, in a proportion of about 1:3, is chilled to the dewaxing or deoiling temperature by exchange with outgoing products and by refrigeration. Oily and waxy materials are separated by employing a rotary drum-type filter and each is subsequently stripped free of solvent. Dewaxing operations are carried out at temperatures of about minus 30° F. to about plus 20° F., while wax deoiling operations are performed at temperatures as high as 100° F. Generally, dewaxing temperatures are about 20° F. lower than the pour point of the finished oil.

Another widely used solvent dewaxing process is the propane dewaxing process. Propane dewaxing differs from other solvent dewaxing processes in that a liquefied hydrocarbon is utilized in pressure equipment. Chilling to temperatures about 30–40° F. lower than the pour point of the finished oil is effected by self-evaporation of the liquid propane combined, when desirable, with extraneous refrigeration. Filtration is performed with rotary or leaf-type pressure filters. The proportions of solvent to oil are similar to those employed in the benzol-ketone process and the dewaxing or deoiling temperatures vary from about minus 40° F. to about plus 100° F.

Other solvent dewaxing methods, such as the Separator-Nobel and Bari-Sol dewaxing processes, utilize centrifuges for separating oil and wax from solvent-diluted wax-containing oils. The former process employs trichloroethylene as the solvent while the latter utilizes a mixture of benzene with ethylene dichloride as the solvent. In general, the dewaxing or deoiling temperatures are about 20° F. lower than the desired pour point of the dewaxed oil. Solvent-to-oil ratios may be as high as 8:1.

More recently, new processes for dewaxing wax-containing mineral oils have been proposed. In general, in these processes, waxy oil is dispersed and/or emulsified in various aqueous and/or non-aqueous media, the dispersion or emulsion is then chilled, and, subsequently, oil is leached from the dispersion or the emulsion of the oil phase in the aqueous or non-aqueous media phase, the latter being the continuous phase.

It is well known that there are numerous disadvantages associated with current methods of dewaxing wax-containing distillate stocks and residual oil stocks. These disadvantages may be classified into two main groups, i. e., those of an operating nature and those of an economic nature. Accordingly, any process which substantially elimates the inherent technological difficulties and minimizes the operating costs of the processes of the prior art is manifestly highly desirable.

In copending application Serial No. 109,692, filed on August 11, 1949, by Harold C. Myers, Arnold O. Pukkila, Abbott F. Houser and William H. King, there is disclosed a process for dewaxing or deoiling wax-oil mixtures, which comprises adding an aqueous solution which is capable of remaining in substantially the liquid state at the dewaxing temperature, to a wax-oil mixture; treating the mixture thus obtained in the presence of a surface active agent to disperse the aqueous solution in the wax-oil mixture; chilling the dispersion to dewaxing temperature; introducing a gas into the dispersion to produce a wax-bearing froth; and separating the wax-bearing froth. Air, helium and carbon dioxide are mentioned as examples of gases suitable for the operation.

It has now been found that it is possible to effect dewaxing of wax-containing distillate stocks and residual oil stocks, utilizing a mechanism whereby wax is removed from a dewaxed oil-solvent solution by gravity separation, in a more efficient, relatively simpler and more economical manner. It has now been discovered that the chilling and flotation operations can be achieved substantially simultaneously through the use of propane or other light hydrocarbons or relatively easily liquefiable gases, wherein the liquefied hydrocarbons or gases effect chilling by evaporative cooling and thereby furnish the gaseous phase for effecting flotation.

Accordingly, it is a broad object of the present invention to provide a process for separating wax or oil from wax-oil mixtures or from solutions of wax in oil. A further object is to effect dewaxing of wax-containing distillate and residual oils which is efficient, economical, and relatively simple. A very important object is to afford an accelerated gravity separation process for effecting dewaxing and wax deoiling of wax-containing oils and of oil-containing waxes, respectively. A more specific object is to provide a gravity separation process for dewaxing wax-containing distillate and residual oils through gas-flotation of the wax, wherein the gas furnishes the means for effecting the chilling, as well as the means for effecting levitation.

Other objects and advantages of the present invention will become apparent to those skilled in the art from the following description taken in conjunction with the drawing showing a diagrammatic illustration of a plant for practicing the process of the present invention.

As stated in the copending application referred to hereinbefore, it is well known in the art that gravity separation of wax from dewaxed oil-solvent solutions occurs at very slow rates, even when utilizing high-gravity solvents. These rates are of such small magnitude as to preclude any commercial application of dewaxing procedures embodying this method of separation. The rates become especially poor, from the standpoint of commercial feasibility, when it is attempted to process distillate oil stocks containing large, interlocking paraffin wax crystals.

In view of the foregoing, and for the purposes of the present invention, it is postulated that the slow rates referred to are attributable to both the crystal habit of waxes and the probable occlusion of dewaxed oil or oil-solvent solution therein, thereby preventing the wax crystals from settling in accordance with their true gravity. In the process of the present invention, these difficulties are overcome through the conjoint use of surface active agents, such as will be defined in more detail hereinafter, and of non-freezing aqueous solutions. It is envisaged that the conjoint use of these materials accomplishes the following:

1. Reduces appreciably the occlusion of dewaxed oil or oil-solvent mixture in the wax product;

2. Contributes to an increase in the difference between the effective specific gravity of the dewaxed oil or oil-solvent mixtures and the effective specific gravity of the wax; and 3. Promotes the agglomeration of the wax crystals in the oil or oil-solvent mixture;

through the attachment of the non-freezing aqueous solutions to the wax crystal surfaces, in the presence of oil or oil-solvent mixtures. Tests have shown also that the wax crystal surfaces which have been wetted by the non-freezing aqueous solutions are capable of adsorbing gas. This further accelerates the rate at which wax crystals can be separated from the dewaxed oil-solvent solution. The thus separated wax crystals can be washed with fresh solvent to remove residual oil or they can be washed with non-freezing aqueous solution to remove entrained oil thereby conserving wash solvent.

As stated in the copending application, and for the primary purpose of providing a more complete understanding of the scope of the present invention, but without any intent of limiting the same, the mechanism whereby wax crystal surfaces are wetted by the non-freezing aqueous solutions, in the presence of oil or oil-solvent mixtures, stripped to its essentials, may be postulated to be as follows: In general, a surface active agent is considered to be a compound, usually an organic compound, one extremity of a molecule of which is polar in nature, in this instance, hydrophilic or oil-repellent, while the other is non-polar in nature, in the present case, hydrophobic or oil-avid. Since wax is essentially oily in character, it follows that with respect to the non-polar end of a molecule of a surface active agent, there will be competition between wax and oil or between wax and an oil-solvent mixture. Conceivably, a surface active agent can be chosen or prepared, a molecule of which possesses a non-polar end which is more avid for wax than for oil or for an oil-solvent mixture. Therefore, in a system consisting of a wax phase dispersed in an oil or an oil-solvent phase, the molecules of such a surface active agent will adsorb at the wax-oil or wax-oil-solvent mixture interfaces. This, in effect, means that the wax surfaces are coated, at least in part, with an oil-repellent film. Hence, when water or an aqueous solution is added to the system as a third phase, water or the aqueous solution becomes attached to the wax surfaces. The resulting system then will consist of wax particles at least partially covered with water or aqueous solution dispersed in a continuous oil or oil-solvent phase.

In normal gravity separation of wax from dewaxed oil or oil-solvent solution, separation occurs by motion of the wax particles, with respect to the dewaxed oil or oil-solvent solution, induced by a difference between the specific gravities of the wax and of the dewaxed oil or oil-solvent solution. Other variables remaining constant, the rate of motion of the wax varies inversely as the viscosity of the dewaxed oil or oil-solvent solution and directly as the difference between the specific gravities and the slip coefficient between dewaxed oil or oil-solvent solution and wax.

As stated hereinbefore, tests have shown that a gas will readily displace water or aqueous solution from the thus-wetted wax surfaces. Accordingly, when a gas is introduced into the system, it will attach itself onto the wax surfaces in the form of bubbles. The result is that the effective gravity of the wax particles in the system is decreased appreciably, thereby increasing the difference between the specific gravities of the components of the system, and hence increasing the rate of motion. Further, in normal gravity separation, the wax particles are in direct contact with dewaxed oil or oil-solvent solution. The great affinity of wax for oil or oil-solvent is well known. In accordance with the present invention, the oil or oil-solvent solution will be in contact, at least to some appreciable extent, with water or aqueous solution. In view of the well known lack of affinity between oil or oil-solvent solution and water or aqueous solution, it follows that a large amount of slip takes place at the interfaces, thereby effecting a further reduction in resistance to motion. Finally, it follows also that any oil or oil-solvent mixture which is separated with the wax product is only such material as is occluded therein. For this reason, it can be removed by washing with water or aqueous solution or solvent thus permitting, theoretically at least, the production of oil-free waxes.

Accordingly, and broadly stated, the present invention provides a process for effecting dewaxing of wax-containing oils and/or deoiling of oil-containing waxes, collectively, wax-oil mixtures, which comprises adding an aqueous solution which is capable of remaining in substantially the liquid state at the dewaxing temperature, to a wax-oil mixture; treating the mixture thus obtained in the present of a surface active agent to disperse the aqueous solution in the wax-oil mixture; introducing a liquefied, low-boiling gas into the dispersion; permitting the liquefied, low-boiling gas to vaporize to produce a wax-bearing froth; and separating the wax-bearing froth.

From the foregoing, it will become apparent to those skilled in the art that the process contemplated herein may be carried out in accordance with several procedures, all of which, nevertheless, are encompassed by the broad statement of invention set forth hereinbefore. Thus, when propane, for example, is used, liquid propane may be added to a solvent-oil system for the purpose of providing refrigeration and levitation of the wax; or liquid propane may be added to a wax-containing oil as the sole dewaxing solvent as well as to provide for refrigeration and levitation of the wax; or liquid propane may be added with a wax antisolvent, such as a ketone, ethyl carbonate or the like, to a wax-containing oil as the sole dewaxing solvent as well as to provide for refrigeration and levitation of the wax.

By way of a non-limiting illustration, a preferred specific embodiment of the present invention may be practiced as follows: A mixture is initially prepared by adding a wax-containing oil stock, such as, for example, a wax distillate having a Saybolt Universal viscosity of 36.35 seconds, at 210° F., and a pour point of 65° F., to about 7.1 per cent by weight of water, 3.9 per cent by weight of ethylene glycol (to provide a non-freezing aqueous solution), and about 0.5 per cent by weight of "Tergitol 7" ($C_{17}H_{34}SO_4Na$), as supplied by Carbide and Carbon Chemical Company, as the surface active agent, based on the stock charged. The mixture is agitated at a temperature of 120–150° F., and then, a 65 per cent trichloroethylene-35 per cent ethylene dichloride blend (oil-solvent) is added to the mixture in an amount to produce a 3:1 dilution with respect to the oil.

Referring now more particularly to the drawing, the mixture is passed through a heat exchanger 1 in heat exchange with dewaxed oil-solvent mixture. During this operation, the temperature of the mixture is lowered to about 50° F. The mixture is then introduced into a column 2 wherein it comes in contact with gaseous propane introduced into the column 2 through a nozzle 3 as liquid propane. The non-freezing aqueous solution of "Tergitol 7" will form a layer in the column 2 above the oil-solvent solution. The wax particles with adsorbed gaseous propane present in the mixture become separated from the latter, ascend, by gravity, through the oil-solvent solution and enter into the non-freezing aqueous solution of "Tergitol 7" floating over the oil-solvent solution. The wax particles with adsorbed gaseous propane continue their upward movement through the aqueous solution in the column 2, are freed thereby of entrained dewaxed oil-solvent solution, collect at the top of the column whence, together with some aqueous solution, they fall into a suitable receiver 4. The wax-aqueous solution mixture in the receiver 4 can be heated to separate the wax. The aqueous solution thus recovered can then be recycled to the process. The dewaxed oil-solvent solution is removed at the bottom of the column 2 through a pump 5 and circulated through the heat exchanger 1. The dewaxed oil-solvent solution is stripped of solvent, which can be recycled to the process, to produce dewaxed oil having a pour point of 40° F. The gaseous propane recovered from the receiver 4 is put through a compressor and condenser system 6 and when liquefied, it is introduced into the column 2 through the nozzle 3.

In a modification of the foregoing, solvent may be used to wash the dewaxed oil-solvent solution entrained by the wax product. In this case, it is preferred to charge the gasified mixture into a column and to wash the gasified mixture countercurrently with chilled, fresh solvent. The wash solvent can then be employed for fresh charge dilution.

In general, any wax-containing oil or any oil-containing wax is amenable to the process of the present invention. The charge stock may be either a distillate stock or a residual stock or oily waxes obtained therefrom. Wax-bearing mineral oils, brown coal tar oils, shale oils, vegetable and animal oils, and synthetically produced oils, any of which may have been previously subjected to a deasphalting treatment, or other treatment for the purpose of improving their physical properties and/or their chemical nature may be mentioned by way of non-limiting examples of materials suitable as charge stocks for the process contemplated herein. There appears to be nothing critical in the amount of wax present in the wax-containing oils to be treated. Thus, the wax-content of the charge stocks may vary between about 0.1 per cent and about 99.9 per cent by weight. On the other hand, the amount of wax present in the mixtures is largely determinative of the fluidity of the charge to the process.

Accordingly, in practicing the invention, it is usually desirable, although not essential, to increase the fluidity of the charge to the process by the addition of an oil-miscible diluent or solvent. For this purpose, the oil-solvents of the prior art may be used. It has been found that a suitable diluent, in general, should possess the following properties. It should be substantially completely miscible with the stock to be treated, it should be substantially insoluble in and immiscible with water, it should not affect, to any appreciable extent, the water- or aqueous solution-gas interfacial tension, it should possess, preferably, a low viscosity coefficient, it should not manifest any substantial tendency to emulsify under the conditions of the process, it should be a poor solvent for solid wax at the dewaxing temperature, it must not disturb the adsorption of the molecules of the surface active agent at the solid wax surfaces, it must not affect, to any appreciable extent, the tendency of the surface active agent to adsorb at the solid wax surfaces, and, finally, it should not displace water from the water- or aqueous solution-coated wax surfaces. Hydrocarbons such as propane, butane, pentane, propene, butenes, pentenes, naphtha, gasoline, benzene and kerosene, and trichloroethylene, methylethyl ketone, ethylene dichloride, methyl chloride, carbon tetrachloride, acetone, and mixtures thereof such as methylethyl ketone-benzene mixtures, acetonitrile-benzene mixtures, ethyl carbonate-propane mixtures, may be mentioned by way of non-limiting examples of diluents or solvents suitable for the purposes of the present invention.

There appears to be nothing critical in the amounts of diluent or solvent used. As stated hereinbefore, the primary purpose of the diluent is to increase the fluidity of the charge to the process. Accordingly, the amounts of solvents used may vary between wide limits. Ordinarily, amounts to produce between about 0.5:1 and about 20:1, preferably between about 2:1 and about 8:1 (volume of solvent to volume of charge stock), dilution are employed. The solvent may be added to the oil at any time during the process and may be added in fractions of the total amount to be used over a period of time prior to the final separation step. In practice, the solvent is added usually prior to or during the chilling step.

Generally speaking, the surface active agents utilizable herein are those which are known as such in the prior art. As stated hereinbefore, the surface active agents are characterized by molecules having a hydrophobic group (the non-polar group) and a hydrophilic group (the polar group). The surface activity of the molecules in an aqueous-non-aqueous system (in the broad sense), such as exists in the process of the present invention, is due to the adsorption of the molecules at an interface. In general, it may be stated that the preferred surface active agents applicable herein are those in which the hydrophobic portion of the molecule is hydrocarbon-like in nature and the hydrophilic portion is a radical selected from the group consisting of —OH, —SO$_3$H, —COOH, —CO, —NH$_2$, —NO$_2$, —N.N—, —N:N.N—, —CSNH, —CONH$_x$, PO$_4\equiv$, —PO$_3$H$_2$, —PO$_2$H, —COO, —COC—, —SO$_4$M, and —SO$_3$M, wherein M is the hydrogen equivalent of a metal. These criteria, therefore, afford the basis for a classification of the various types of surface active agents suitable for the purposes contemplated herein. For convenience, the types may be tabulated as follows:

TABLE I

*Types of surface active agents*

TYPE A

| Group Name | Formula |
|---|---|
| 1. Fatty acid salt | R-COOM. |
| 2. Dimetal salt of a sulfated fatty acid. | RC$_2$H$_{2n-2}$(SO$_4$M)COOM. |
| 3. Glyceryl ester of a fatty acid. | RCOOCH$_2$CHOHCH$_2$OH. |
| 4. Metal sulfonate of a fatty acid ester. | RCOOCH$_2$CH$_2$SO$_3$M. |
| 5. Metal sulfonate of a fatty acid amide. | RCONHCH$_2$CH$_2$SO$_3$M. |
| 6. Fatty acid amide ethyl dialkyl amine. | RCONHCH$_2$CH$_2$NR'R''. |

TYPE B

| | |
|---|---|
| 1. Metal alkyl sulfate | RSO$_4$M. |
| 2. Metal secondary alkyl sulfate | R$_2$CHSO$_4$M. |
| 3. Metal bisulfate of dialkyl dicarboxylate. | R'COCH$_2$<br>‖<br>O<br>RCOCHSO$_4$M<br>‖<br>O |

TYPE C

| | |
|---|---|
| 1. Metal alkyl sulfonate | RSO$_3$M. |
| 2. Metal aryl sulfonate | Aryl SO$_3$M. |
| 3. Metal alkaryl sulfonate | R'Aryl SO$_3$M. |

TYPE D

| | |
|---|---|
| Quaternary ammonium halide | $\begin{bmatrix} R' & R'' \\ & N & \\ R & R''' \end{bmatrix} X$ |

TYPE E

| | |
|---|---|
| Natural substances | |

Wherein

M is the hydrogen equivalent of a metal, usually an alkali metal,
R, R', R'' and R''' are alkyl or alkenyl radicals,
X is a halogen, and
$n$ is a whole number.

A number of surface active agents were tested in accordance with the procedure set forth in the specific embodiment described hereinbefore, and were found to be effective in the operation of the process. For convenience, these materials are tabulated in Table II.

TABLE II
*Effective surface active agents*

| Chemical Name or Formula | Trade Name |
| --- | --- |
| 1. 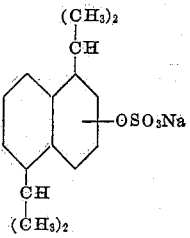 | Nekal A. |
| 2. 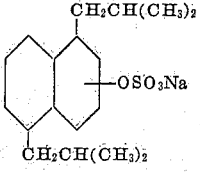 | Nekal B. |
| 3. $C_{14}H_{29}SO_4Na$ | Tergitol 4. |
| 4. $C_{17}H_{34}SO_4Na$ | Tergitol 7. |
| 5. Sodium-wax phenol sulfonate | |
| 6. Sorbitan monostearate[1] | Span 60. |
| 7. $C_{12}H_{25}C_6H_3(OH)SO_3Na$ | |
| 8. $C_8H_{19}C_6H_3(OH)SO_3Na$ | |
| 9. $(C_{18}H_{37})_3C_6H(OH)SO_3Na$ | |
| 10. 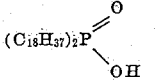 | |
| 11. 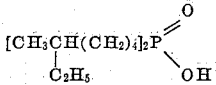 | |
| 12. 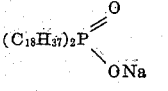 | |
| 13. 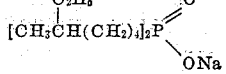 | |

[1] Sorbitan is derived from the dehydration of sorbital to cause ring closure through an ether linkage to produce six-member or five-member rings.

The surface active agents enumerated in Table II are illustrative of specific surface active agents operable in the process of the present invention. Alkali metal wax-aromatic sulfonates or alkali metal wax-oxyaromatic sulfonates are typical of one of the preferred classes of surface active agents to be used herein and in order to furnish the criteria to be applied in the selection of a surface active agent which will give optimum results with a given charge stock, further discussion of surface active agents utilizable herein will be had in conjunction with this class.

Materials known as wax-phenol sodium sulfonate, for example, may be prepared, as is well known in the art, in accordance with the following procedure (U. S. Patent to Reiff et al., No. 2,252,666):

A paraffin wax having a melting point of about 120° F. and predominantly comprised of compounds having at least 20 carbon atoms per molecule is chlorinated by heating to about 200° F. and bubbling chlorine therethrough until the chlorwax obtained contains from about 10 per cent to about 21 per cent by weight of chlorine. The chlorwax is then condensed with phenol, at a temperature of about 350° F. and in the presence of about 4 per cent to about 10 per cent by weight of an aluminum chloride Friedel-Crafts catalyst, to produce wax-substituted phenol. This product is treated with chlorosulfonic acid in amounts, on a weight basis, of about 100–175 per cent of theoretical, in a conventional sulfonation operation, at a temperature of about 125–200° F., and the product thus obtained is neutralized with sodium hydroxide in amounts, on a weight basis, of about 120–150 per cent of theoretical, at a temperature of about 150° F.

In general, the structure of materials known as wax-phenol metal sulfonates is visualized to be as follows:

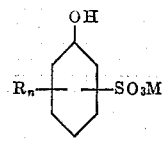

wherein R may be wax or other hydrocarbon radical of comparable chain length, M is the hydrogen equivalent of a metal, and $n$ is 1 to 3. The wax groups may be derived from a fraction of a viscous mineral oil ranging in molecular weight from that of a light wax distillate to a heavy residuum. The primary factor to be considered in determining the value of $n$ is the resulting solubility of the compound in water.

Materials known as wax-phenol (1–14) sodium sulfonate are a good example of a surface active agent useful in the process of the present invention. With respect to the connotation (1–14), the first number indicates the theoretical degree of alkylation, i. e., the atomic proportions of chlorine in the chlorwax which is reacted with one mol of the hydroxy aromatic compound, and the second number indicates the weight per cent of chlorine in the chlorwax. The wax-phenol (1–14) sodium sulfonate actually is a mixture of the mono-wax-phenol sulfonate, the diwax-phenol sulfonate, and of some poly-wax-phenol sulfonates.

The test for determining whether a surface active agent will be operable or not in the process of the present invention is the bubble machine test [see Engineering and Mining Journal, 137, 291 (1936)] equipped with a cold stage. In this test, a piece of wax of the type to be removed and having at least one relatively flat surface is immersed in the oil-wax or oil-wax-solvent mixture to be dewaxed containing 0.1 per cent by weight solution of the surface active agent to be tested. The system is then cooled to the dewaxing temperature. A droplet of non-freezing aqueous solution containing 0.1 per cent by weight of the surface active agent to be tested is placed in a bubble holder and the droplet is then permitted to come into contact with the wax surface. If a finite three-phase (from wax through oil or oil-solvent to non-freezing aqueous solution) contact angle can be measured, the surface active agent being tested will be operable in the process of the present invention. The larger the three-phase contact angle, the more effectual the surface active agent will be in the process. Therefore, if the non-freezing aqueous solution spreads over the entire flat wax surface (contact angle = 180°) the surface active agent being tested will be very effectual. Accordingly, the surface active agents operable herein can be defined as those which produce a finite three-phase contact angle in the bubble machine test at the dewaxing temperature.

Using the bubble machine test, a number of surface active agents were tested with the following results:

TABLE III

[Non-freezing aqueous solution=60% water+40% ethylene glycol; oil solvent=52% benzol, 40% methyl ethyl ketone and 8% toluol.]

| Surface Active Agent | Three-Phase Contact Angle, Degrees | |
|---|---|---|
| | Paraffin Wax | Micro-crystalline Wax |
| Sodium Wax Phenol (1-14) Sulfonate | 17 | 17 |
| Tergitol 7 | 22 | <10 |
| Tergitol 4 | 22 | <10 |
| Span 60 | 50 | 50 |
| Nekal A | 43 | <10 |
| Nekal B | 47 | <10 |
| $C_{12}H_{25}C_6H_3(OH)SO_3Na$ | 36 | <10 |
| $C_9H_{19}C_6H_3(OH)SO_3Na$ | 24 | <10 |
| $(C_{18}H_{37})_3C_6H(OH)SO_3Na$ | 24 | <10 |
| $(C_{18}H_{37})_2P{\overset{O}{\underset{OH}{\diagdown}}}$ | 60 | <10 |
| $[CH_3CH(CH_2)_4]_2P{\overset{O}{\underset{OH}{\diagdown}}}$ with $C_2H_5$ | 30 | <10 |

The amounts of surface active agent to be used may vary between wide limits. Ordinarily, excessive amounts are to be avoided since it has been found that they effect emulsification of the oil or oil-solvent mixture in the non-freezing aqueous solution. On the other hand, the use of insufficient amounts will result in an incomplete separation of the wax. In general, the amounts of surface active agent to be used depend upon the amount of wax present in the stock undergoing treatment. Obviously, the optimum amounts to be utilized in any given instance can be readily determined by those skilled in the art by a few preliminary tests. In practicing the invention, it has been found that amounts varying between about 0.01 per cent and about 10 per cent, preferably between about 0.3 per cent and about 3 per cent, based on the weight of the wax-containing oil or oil-containing wax in the charge will produce satisfactory results.

The surface active agent is ordinarily added to the charge as a solution in water. In conformance with the mechanism of operation postulated hereinbefore, the water is an essential factor in the successful operation of the process of the present invention, the wax surfaces becoming at least partially covered with water or aqueous solution. The amounts of water to be used depend upon the amount of wax present in the stock undergoing treatment. Obviously, the optimum amounts to be utilized in any given instance can be readily determined by those skilled in the art by a few preliminary tests. In practice, it has been found that amounts varying between about 1 per cent and about 200 per cent, preferably between about 25 per cent and about 75 per cent, based on the weight of the wax-containing oil or oil-containing wax in the charge will produce satisfactory results.

Also, in accordance with the modus operandi of the process of the present invention, it is likewise essential that the water remain in the liquid state at the dewaxing temperatures utilized. Accordingly, various substances are added to the water to lower its freezing point to a temperature below that at which dewaxing is effected. These substances, preferably, should be substantially completely soluble in and miscible with water, they should not manifest any substantial tendency to emulsify under the conditions of the process, they should be poor solvents for solid wax at the dewaxing temperatures, they must not disturb the adsorption of the molecules of the surface active agent at the solid wax surfaces, and, finally, they must not affect, to any appreciable extent, the tendency of the surface active agent to concentrate at the solid wax surfaces. Ethylene glycol, sodium chloride and glycerine may be mentioned by way of non-limiting examples of substances adapted to produce non-freezing aqueous solutions utilizable in the process contemplated herein.

The amounts of these substances to be employed, obviously, will depend on the amount of water being utilized and on the type of material being used for such purposes. As will be appreciated by those skilled in the art, the amounts to be used in any particular case can be readily determined by a few preliminary tests once the dewaxing temperature to be applied has been established, the criteria applicable being, as stated hereinbefore, to maintain the water solution in the liquid state at dewaxing temperatures.

In general, any substance which is capable of remaining in the gaseous state at the dewaxing temperature and which is capable of being compressed and condensed into a liquid with relative ease may be used in the process of the present invention. Obviously, the substance so utilized must be substantially chemically unreactive with or inert with respect to the other components of the system and, preferably, should be substantially insoluble in the wax-oil or solvent-wax-oil mixtures and in the water or aqueous solution present in the system. Propane is eminently suited for this purpose although other liquefiable, low-boiling materials, such as carbon dioxide, ethylene, propylene, and foron, may be used as sources of refrigeration in addition to providing the gaseous phase of the system. Thus, for example, as stated hereinbefore, propane is liquefied under pressure and thus introduced into the system as a liquid. Pressure is then reduced to produce propane gas, thereby lowering the temperature of the system toward the dewaxing temperature.

Agitation is necessary to effect dispersion of the non-freezing aqueous solution in the wax-bearing oil in the initial stages of the process and to effect gas bubble attachment to the aqueous solution-wetted wax particles in the later stages of the process. In the specific embodiment described hereinbefore, the ascent of the propane gas bubbles through the column achieves the agitation necessary to effect bubble attachment.

In order to facilitate the dispersion of the non-freezing aqueous solution in the wax-oil mixture during the initial stages of the process and, also, to ensure that the wax-oil mixture or wax-oil-solvent mixture constitutes a homogeneous liquid phase at the beginning of the treatment, it is ordinarily preferred to heat the mixture to temperatures varying between about 100° F. and about 200° F. during the dispersion operation but prior to the gasification operation. The temperature to be utilized to produce optimum results will depend upon the nature of the stock undergoing treatment.

The dewaxing temperatures applicable in the process are those of the prior art, i. e., between about −40° F. and about 100° F. It must be recognized, of course, that the dewaxing temperature applicable in any particular instance will depend upon the nature of the system, i. e., the surface active agent utilized, the type of aqueous solution, the type of dewaxing solvent, etc.

The rate at which the temperature of the mixture is lowered to dewaxing temperature (the chilling rate) is not a critical factor, although, as it will be appreciated by those skilled in the art, an important factor. The chilling rate, as is well known, is determinative of the size of the wax crystals that precipitate out during the chilling operation. For general purposes, it has been found that an average chilling rate varying between 10° F. per hour and about 500° F. per hour is conducive to optimum results. In general, the higher chilling rates are preferred when processing distillate stocks, while the lower chilling rates are employed, preferably, when treating residual stocks.

Although the foregoing discussion has indicated a preferred sequence of the addition of the various components to the system and of the manipulations involved in the process, it must be clearly understood that departures from them may be made. For example, the wax-oil mixture, the oil solvent and the non-freezing aqueous solution of surface active agent, may be separately chilled and then mixed at any temperature down to the dewaxing temperature. Finally, instead of a tower, tanks, filters, centrifuges and the like can be used to effect the separation of the water- or aqueous solution-wetted wax particles or crystals from the oil or oil-solvent mixtures. It will be apparent also that the process may be operated as a batch or discontinuous process or as a continuous process. Moreover, in many cases, it will be found to be advantageous to carry out the operation in stages. For example, the dewaxing may be effected at decreasingly lower dewaxing temperatures, down to the final dewaxing temperature, the operation contemplated herein being carried out in each stage with the "dewaxed" product of each stage constituting the charge stock for the subsequent stage.

In view of the foregoing, it will be appreciated by those skilled in the art, that surface active agents operable in the process contemplated herein may be present in, or may be introduced into, the system through the wax-oil mixture, through the solvent, or, possibly, through the substances utilized for maintaining the water in substantially the liquid state at the dewaxing temperature. These contingencies can be readily established through a bubble machine test carried out in the absence of an added surface active agent. Accordingly, it must be clearly understood that when in the specification and in the claims hereof, the presence of a surface active agent is referred to, either the introduction of a surface active agent into the system through these contingencies or the actual addition of a surface active agent to the system, or both, is intended.

It will be apparent from the foregoing that the present invention provides an efficient, economical, and relatively simple process for effecting gravity separation of wax or oil from wax-oil mixtures. It will be appreciated by those skilled in the art that the present invention may be embodied in other specific forms without departing from the spirit or essential attributes thereof. Accordingly, it must be clearly understood that the present embodiments be considered in all respects illustrative and not restrictive, reference being had to the appended claims rather than to the foregoing description to indicate the scope of the invention.

What is claimed is:

1. A process for separating wax and oil from a wax-oil mixture, which comprises adding an aqueous solution which is capable of remaining in substantially the liquid state at the dewaxing temperature, to said wax-oil mixture, in an amount varying between about one per cent and about 200 per cent, based on the weight of the wax-oil mixture, to produce an aqueous solution-wax-oil mixture; treating said aqueous solution-wax-oil mixture in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase; introducing a liquified, low-boiling material into said dispersion; permitting said liquified, low-boiling material to vaporize to precipitate wax and to produce gas; continuing said treating to associate said wax and said gas with the dispersed aqueous solution phase, thereby producing a wax-bearing froth; and separating said wax-bearing froth from said dispersion.

2. A process for separating wax and oil from a wax-oil mixture, which comprises adding a solvent to said wax-oil mixture to produce a solvent-wax-oil mixture; adding an aqueous solution which is capable of remaining in substantially the liquid state at the dewaxing temperature, to said solvent-wax-oil mixture, in an amount varying between about one per cent and about 200 per cent, based on the weight of the wax-oil mixture, to produce an aqueous solution-solvent-wax-oil mixture; treating said aqueous solution-solvent-wax-oil mixture in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase; introducing a liquified, low-boiling material into said dispersion; permitting said liquified, low-boiling material to vaporize to precipitate wax and to produce gas; continuing said treating to associate said wax and said gas with the dispersed aqueous solution phase, thereby producing a wax-bearing froth; and separating said wax-bearing froth from said dispersion.

3. A process for separating wax and oil from a wax-oil mixture, which comprises adding an aqueous solution which is capable of remaining in substantially the liquid state at the dewaxing temperature, to said wax-oil mixture, in an amount varying between about one per cent and about 200 per cent, based on the weight of the wax-oil mixture, to produce an aqueous solution-wax-oil mixture; agitating said aqueous solution-wax-oil mixture in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase; introducing a liquified, low-boiling material into said dispersion; permitting said liquified, low-boiling material to vaporize to precipitate wax and to produce gas; continuing said agitating to associate said wax and said gas with the dispersed aqueous solution phase, thereby producing a wax-bearing froth; and separating said wax-bearing froth from said dispersion.

4. A process for separating wax and oil from a wax-oil mixture, which comprises adding a solvent to said wax-oil mixture, in an amount to produce a solvent-wax-oil mixture in which the solvent to wax-oil mixture volume ratio varies between about 0.5:1 and about 20:1; adding an aqueous solution which is capable of remaining in substantially the liquid state at the dewaxing temperature, to said solvent-wax-oil mixture, in an amount varying between about one per cent and about 200 per cent, based on the weight of the wax-oil mixture, to produce an aqueous solution-solvent-wax-oil mixture; agitating said aqueous solution-solvent-wax-oil mixture in the presence of a surface active agent that produces a finite three-phase contact angle in the bubble machine test at the dewaxing temperature, in amounts of at least 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase; introducing a liquified, low-boiling material into said dispersion; permitting said liquified, low-boiling material to vaporize to precipitate wax and to produce gas; continuing said agitating to associate said wax and said gas with the dispersed aqueous solution phase, thereby producing a wax-bearing froth; and separating said wax-bearing froth from said dispersion.

5. A process for separating wax and oil from a wax-oil mixture, which comprises an aqueous solution which is capable of remaining in substantially the liquid state of the dewaxing temperature, to said wax-oil mixture, in an amount varying between about one per cent and about 200 per cent, based on the weight of the wax-oil mixture, to produce an aqueous solution-wax-oil mixture; agitating said aqueous solution-wax-oil mixture in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a wax-oil mixture-in-aqueous solution emulsion in which the aqueous solution is the continuous phase, to produce a dispersion in which the aqueous solution is the dispersed phase and the wax-oil mixture is the continuous phase; introducing liquified propane into said dispersion; permitting said liquified propane to vaporize to precipitate wax and to produce propane gas; continuing said agitating to associate said wax and said propane gas with the dispersed aqueous solution phase, thereby producing a wax-bearing froth; and separating said wax-bearing froth from said dispersion.

6. A process for separating wax and oil from a wax-oil mixture, which comprises adding a solvent to said wax-oil mixture, in an amount to produce a solvent-wax-oil mixture in which the solvent to wax-oil mixture volume ratio varies between about 0.5:1 and about 20:1; adding an aqueous solution which is capable of remaining in substantially the liquid state at the dewaxing temperature, to said solvent-wax-oil mixture, in an amount varying between about one per cent and about 200 per cent, based on the weight of the wax-oil mixture, to produce an aqueous solution-solvent-wax-oil mixture; agitating said aqueous solution-solvent-wax-oil mixture in the presence of a surface active agent that produces a finite three-phase contact angle in the bubble machine test at the dewaxing temperature, in amounts of at least about 0.01 per cent, based on the weight of the wax-oil mixture, but less than the amount necessary to promote formation of a solvent-wax-oil mixture-in-aqueous solution emulsion in which the aqueous solution is the continuous phase, to produce a dispersion in which the aqueous solution is the dispersed phase and the solvent-wax-oil mixture is the continuous phase; introducing liquified propane into said dispersion; permitting said liquified propane to vaporize to precipitate wax and to produce propane gas; continuing said agitating to associate said wax and said propane gas with the dispersed aqueous solution phase, thereby producing a wax-bearing froth; and separating said wax-bearing froth from said dispersion.

7. A process for separating wax and oil from a wax-oil mixture, which comprises adding an aqueous solution which is capable of remaining in substantially the liquid state at the dewaxing temperature, to said wax-oil mixture, in an amount varying between about 25 per cent and about 75 per cent, based on the weight of the wax-oil mixture, to produce an aqueous solution-wax-oil mixture; agitating said aqueous solution-wax-oil mixture in the presence of $Na(C_{17}H_{34})SO_4$, in amounts varying between about 0.3 per cent and about 3 per cent, based on the weight of the wax-oil mixture, to produce a dispersion in which the aqueous solution is the dispersed phase and the wax-oil mixture is the continuous phase; introducing liquified propane into said dispersion; permitting said liquified propane to vaporize to precipitate wax and to produce propane gas; continuing said agitating to associate said wax and said propane gas with the dispersed aqueous solution phase, thereby producing a wax-bearing froth; and separating said wax-bearing froth from said dispersion.

8. A process for separating wax and oil from a wax-oil mixture, which comprises adding a solvent to said wax-oil mixture, in an amount to produce a solvent-wax-oil mixture in which the solvent to wax-oil mixture to volume ratio varies between about 2:1 and about 8:1; adding an aqueous solution which is capable of remaining in substantially the liquid state at the dewaxing temperature, to said solvent-wax-oil mixture, in an amount varying between about 25 per cent and about 75 per cent, based on the weight of the wax-oil mixture, to produce an aqueous solution-solvent-wax-oil mixture; agitating said aqueous solution-solvent-wax-oil mixture in the presence of $Na(C_{17}H_{34})SO_4$, in amounts varying between about 0.3 per cent and about 3 per cent, based on the weight of the wax-oil mixture, to produce a dispersion in which the aqueous solution is the dispersed phase and the solvent-wax-oil mixture is the continuous phase; introducing liquified propane into said dispersion; permitting said liquified propane to vaporize to precipitate wax and to produce propane gas; continuing said agitating to associate said wax and said propane gas with the dispersed aqueous solution phase, thereby producing a wax-bearing froth; and separating said wax-bearing froth from said dispersion.

JOHN W. PAYNE.

References Cited in the file of this patent

UNITED STATES PATENTS

| Number | Name | Date |
| --- | --- | --- |
| 2,062,374 | Noel | Dec. 1, 1936 |
| 2,116,144 | Dickinson | May 3, 1938 |
| 2,153,895 | McKittrick et al. | Apr. 11, 1939 |
| 2,161,581 | Knowles | June 8, 1939 |
| 2,164,013 | Jenkins | June 27, 1939 |
| 2,164,773 | Knowles | July 4, 1939 |
| 2,168,306 | Schutte | Aug. 1, 1939 |
| 2,263,535 | Carr et al. | Nov. 18, 1941 |